(No Model.)
F. A. GLAESER.
APPARATUS FOR VARNISHING CANS.
No. 309,343.  Patented Dec. 16, 1884.
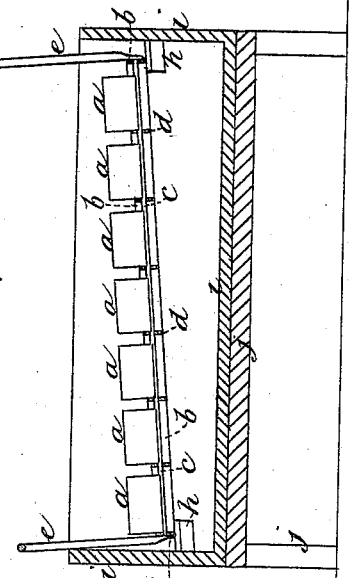
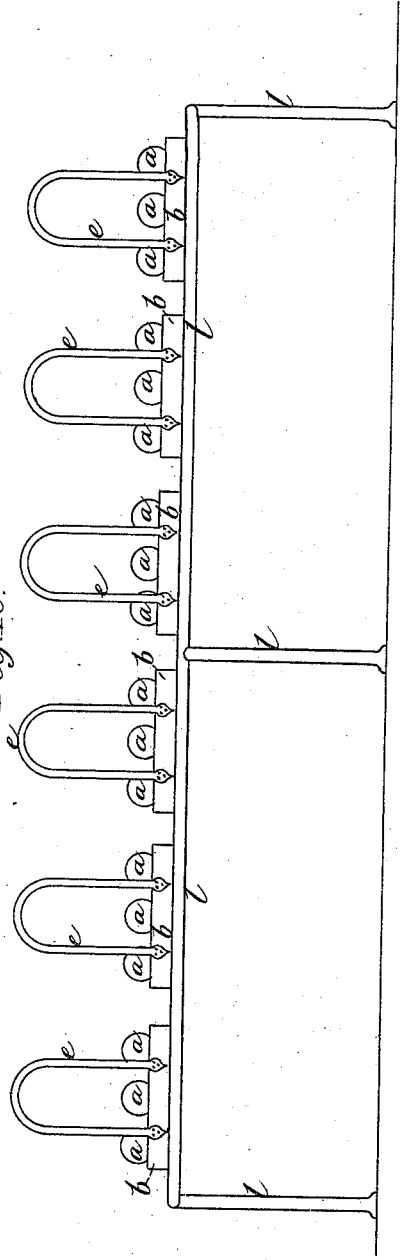

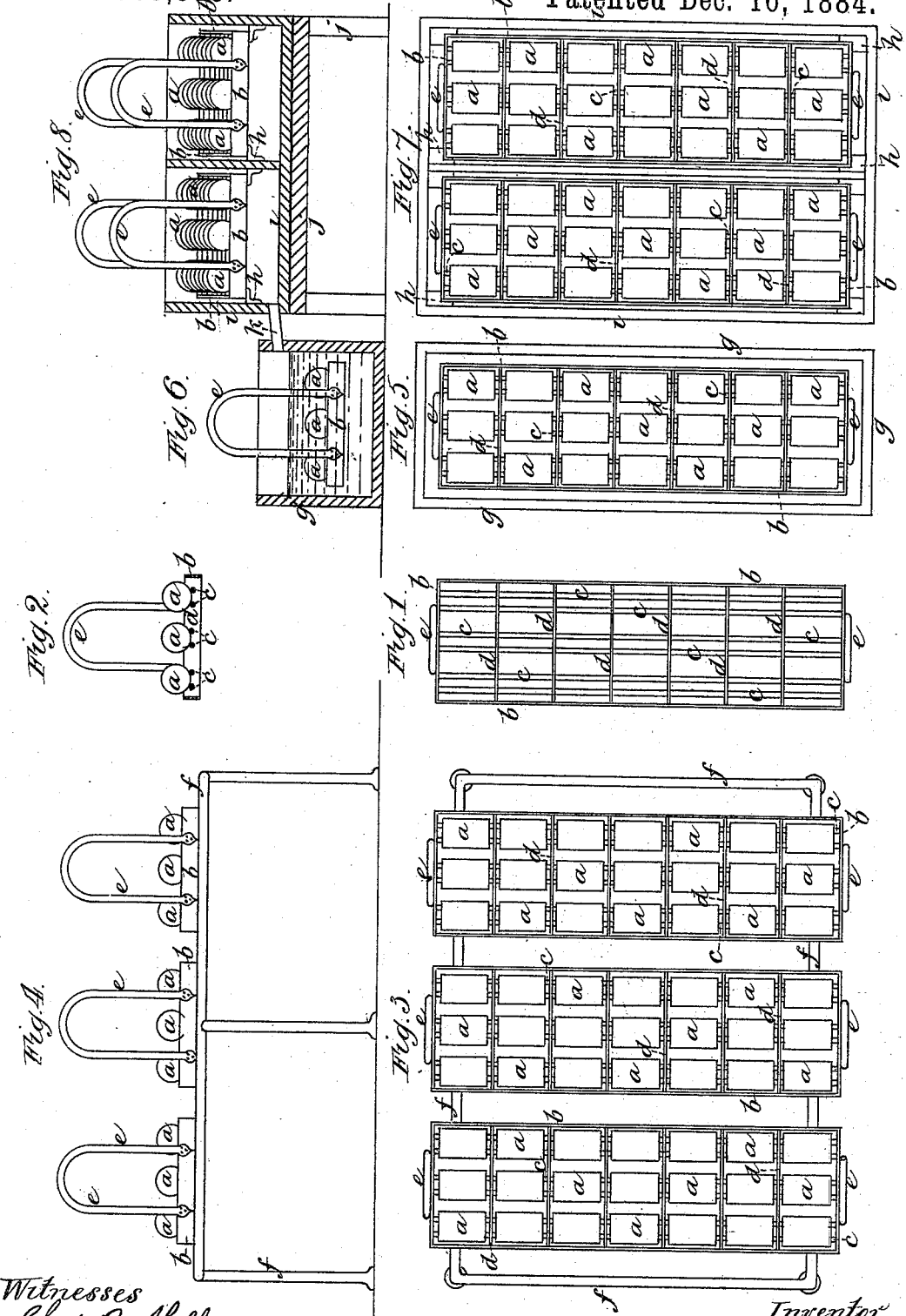

UNITED STATES PATENT OFFICE.

FREDERICK ALBERT GLAESER, OF STRATFORD, COUNTY OF ESSEX, ENGLAND.

APPARATUS FOR VARNISHING CANS.

SPECIFICATION forming part of Letters Patent No. 309,343, dated December 16, 1884.

Application filed January 19, 1884. (No model.)

*To all whom it may concern:*

Be it known that I, FREDERICK ALBERT GLAESER, a subject of the Emperor of Germany, residing at Stratford, in the county of Essex, England, have invented a new and useful improved method of and apparatus for coating or varnishing tins or cans containing preserved provisions or the like, of which the following is a specification.

This invention relates to an improved method of and apparatus for coating or varnishing hermetically-closed tins containing preserved fish, meat, vegetables, fruit, butter, and other perishable articles for the purpose of preventing the tins from becoming oxidated or rusty and for giving them a more attractive appearance. Hitherto the operation of coating such tins has been effected by hand, and paints have generally been employed; but the use of paint is attended by the disadvantage of drying very slowly. Varnishes or lacquer have been employed; but these have also been applied by hand, and have necessitated skill in their application.

Now, according to my invention I entirely dispense with skilled labor and effect the coating operation in a much more speedy manner than hitherto, and give a better and more attractive appearance to the tins when finished.

The apparatus I employ consists, substantially, of trays of the construction hereinafter described, in combination with a dipping-tank, a dripping-tank, and drying-stands.

In carrying out my invention the hermetically-closed tins $a\ a$ are placed in trays constructed as shown in Figures 1 and 2 of the drawings, Fig. 1 being a plan of one of the trays, and Fig. 2 a transverse section of the same with the tins placed thereon. Each tray consists of a rectangular metal frame, $b\ b$, with longitudinal supporting-bars $c\ c$ and transverse dividing-bars $d\ d$. The bars $c\ c$ serve to support the tins $a$, and the bars $d\ d$ separate the tins endwise. Each end of the tray is provided with a handle, $e$, for moving the tray, as hereinafter described. The tins, $a\ a\ a$, to be coated are placed upon a number of these trays, and the same are placed on stands $f\ f$, as shown in plan and end view at Figs. 3 and 4. A boy or girl or man, as the case may be, according to the size of the trays employed, takes hold of each end of a loaded tray by its handle $e$ and dips the same in a tank, such as $g$, containing enough varnish to permit the tins, when dipped therein, to be fully covered, as shown in Fig. 5, which is a plan, and in Fig. 6, which is a cross-section, of a dipping-tank, showing a tray loaded with tins dipped therein. The varnishes which I have found it most advantageous to employ as giving good results are what are known as "Conrad W. Schmidt's (F. A. Glaeser's) metal-varnishes." The tray having been dipped, as described, the tins will be completely covered with the varnish, and the tray is lifted and the varnish allowed to drip off during a few seconds. The tray, with the coated tins, is then passed to what I term the "dripping-tank." One of these tanks (adapted to contain two trays) is shown in plan at Fig. 7, in cross-section at Fig. 8, and in longitudinal section at Fig. 9. These tanks are provided with supports $h\ h$, so that the trays containing the coated tins will rest at an incline, as shown in Figs. 8 and 9, to better allow the surplus varnish to drip off into the tank, the cross-bars $d$ of the trays keeping the tins apart endwise. The dripping-tank $i$ may be placed on a stand, $j$, as shown, above the level of the dipping-tank $g$, and the two tanks may be connected together by a pipe, as at $k$, to allow the varnish dripping from the tins in the tank $i$ to flow back into the dipping-tank $g$. As soon as the superfluous varnish shall have dripped off, the trays are removed from the tank $i$ and placed on stands, such as $l$, as shown in Fig. 10, and the varnish on the tins soon becomes dry enough to allow the tins to be removed from the trays and be piled in rows or otherwise to allow the varnish to thoroughly harden. As the trays are emptied they are ready to be filled with fresh tins to be operated on in the manner hereinbefore described, and so on continuously.

It will be obvious that the size and form of the trays and of the dipping and dripping tanks may be varied according to circumstances and according to the size of the tins to be coated.

Having thus described my invention, what I claim is—

1. The improved dipping-tray described, provided with a lifting handle or handles, $e$, and having a system of parallel longitudinal supporting-bars $c$ and the transverse dividing-bars $d$, as and for the purposes set forth.

2. In combination with the described trays having the supporting-bars $c$ and dividing-bars $d$, a tank, $g$, for dipping, a tank, $i$, for dripping, and stands $l$, the stand and tanks being adapted for the trays, all substantially as and for the purposes described.

F. A. GLAESER.

Witnesses:
G. F. REDFERN,
F. W. PRICE.